United States Patent
Braekevelt

(10) Patent No.: US 6,787,491 B2
(45) Date of Patent: Sep. 7, 2004

(54) WOVEN COMPOSITE FABRIC

(75) Inventor: Geert Braekevelt, Zwevegem (BE)

(73) Assignee: N.V. Bekaert S.A., Zwevegem (BE)

( * ) Notice: Subject to any disclaimer, the term of this patent is extended or adjusted under 35 U.S.C. 154(b) by 97 days.

(21) Appl. No.: 10/149,120

(22) PCT Filed: Dec. 13, 2000

(86) PCT No.: PCT/EP00/12760

§ 371 (c)(1),
(2), (4) Date: Jun. 7, 2002

(87) PCT Pub. No.: WO01/44549

PCT Pub. Date: Jun. 21, 2001

(65) Prior Publication Data

US 2003/0082336 A1 May 1, 2003

(30) Foreign Application Priority Data

Dec. 15, 1999 (EP) .............................. 99204338
Dec. 15, 1999 (EP) .............................. 99204339
Dec. 15, 1999 (EP) .............................. 99204340

(51) Int. Cl.[7] ................ D03D 15/00; D03D 49/50; B32B 5/08; B32B 3/10; B32B 23/02

(52) U.S. Cl. ................ 442/212; 442/185; 442/187; 442/208; 442/269; 442/213; 442/229; 428/137; 428/193; 428/195; 139/716.1

(58) Field of Search .............................. 442/185, 187, 442/208, 269, 212, 213, 229; 428/137, 193, 195

(56) References Cited

U.S. PATENT DOCUMENTS 3,897,289 A    7/1975 Di Paola
3,930,091 A    12/1975 Lewis et al.
5,071,699 A  * 12/1991 Pappas et al. .............. 442/110
5,212,010 A    5/1993 Curzio et al.
5,236,529 A    8/1993 Ferrier et al.

FOREIGN PATENT DOCUMENTS

| AT | 198914 | 8/1958 |
|---|---|---|
| EP | 0 109 505 A2 | 5/1984 |
| EP | 0 234 463 A1 | 9/1987 |
| EP | 0 392 904 A1 | 10/1990 |
| EP | 0 546 962 A1 | 6/1993 |
| EP | 0 758 693 A1 | 2/1997 |
| EP | 0 940 277 A1 | 9/1999 |
| FR | 1290278 | 3/1962 |
| FR | 2 708 294 A1 | 2/1995 |
| GB | 957248 | 5/1964 |
| GB | 1 174 292 | 12/1969 |
| GB | 1 176 344 | 1/1970 |
| GB | 1 374 223 | 11/1974 |
| JP | 54001357 | 6/1977 |
| WO | WO 99/10174 A1 | 3/1999 |
| WO | 99/20682 | 4/1999 |

* cited by examiner

Primary Examiner—Terrel Morris
Assistant Examiner—Lynda Salvatore
(74) Attorney, Agent, or Firm—Foley & Lardner LLP

(57) ABSTRACT

As subject of the present invention, a woven composite fabric, comprising metal elements (51) and polymer elements (52) is provided. The metal elements (51) being metal wires, bundles of metal wires, metal strands or metal cords. According to the invention, the polymer elements (52) are polymer tapes, having a substantially rectangular cross-section.

14 Claims, 5 Drawing Sheets

WOVEN COMPOSITE FABRIC

FIELD OF THE INVENTION

The present invention relates to a woven composite fabric, comprising metal elements. Further, the present invention relates to the use of such woven fabric to provide flexible reinforced tubes and/or hoses.

BACKGROUND OF THE INVENTION

Flexible reinforced tubes and hoses are widely known in the art.

A method to produce such reinforced tubes and hoses, comprises the steps of winding reinforcing material round a polymer tube or hose or round a mandrel. E.g. U.S. Pat. No. 3,930,091 shows such method to provide a reinforced tube, winding glasfibers round a mandrel.

When metal elements, being metal wires, bundles of metal wires, metal cords or metal strands are to be used to reinforce a tube or hose, a polymer strip, comprising metal elements running essentially in the longitudinal direction of the strip may be used. Such strips are wound round a polymer tube or on a mandrel. Afterwards, after providing the reinforcing layers, the polymer is to be heated to ensure the adhesion of the polymer layers to each other and eventually to the polymer tube supporting the reinforcing layers.

The advantage of the use of such strips is that only one or a few strips are to be controlled during production of the reinforced tube or hose, rather than controlling individually a large set of metal elements during production.

The present invention relates to disadvantages, which may be met using such polymer strips, comprising metal elements in longitudinal direction. These disadvantages are mainly that no polymer material can make contact with a metal element of an adjacent layer, when two (or more) layers of such strips are wound on top of each other. Further, due to the necessary thickness of the polymer material surrounding the metal elements, a minimum thickness of the reinforcing layer is provided, which for some applications still is too thick. Too much than necessary polymer material may be present between different layers of metal elements.

SUMMARY OF THE INVENTION

As subject of the present invention, a woven composite fabric is provided, comprising metal elements and polymer elements. These polymer elements are, according to the present invention, polymer tapes.

In the scope of the present invention, metal element is to be understood as a metal wire, a bundle of metal wires, a metal strand or a metal cord.

In the scope of the present invention, polymer tape is to be understood as a small tape of polymer sheet. Such polymer tapes have a substantially rectangular cross-section. The width of such tape is preferably less than 10 mm, e.g. less than 5 mm, e.g. 3 mm. The thickness of such tape is preferably less than 100 $\mu$m, e.g. less than 150 $\mu$m, preferably less than 100 $\mu$m, most preferably less than 30 $\mu$m such as 15 $\mu$m. It is clear that the finer the metal element, the thinner the preferred polymer tapes.

Different weaving structures and different weaving densities may be used to provide several alternative woven composite fabrics as subject of the invention. Weaving structures such as plain woven structures, reinforced plain woven structures (with double or multiple warps and/or wefts), twill woven structures, reinforced twill woven structures (with double or multiple warps and/or wefts), satin woven structures, reinforced satin woven structures (with double or multiple warps and/or wefts) may be used.

A weaving density of a woven composite fabric as subject of the invention may be very high. Especially when metal elements are present in only one direction of the woven composite fabric, both polymer tapes and/or metal elements may be present side-by-side in the woven composite fabric. This mainly because of the high flexibility of the polymer tapes. Further, due to the high flexibility of the polymer tapes, the metal elements may run substantially straight in a woven composite fabric as subject of the invention, in case the metal elements are present in only one direction of the fabric. In the opposite direction, in which only polymer tapes are present, these tapes will be bent around the circumference of the metal elements. Since the metal elements are substantially straight, its inweaving factor may be equal to 1.

The inweaving factor is to be understood as the ratio of the length of the element, compared to the length of the fabric, in which the element is present, measured in the direction in which the element runs through the fabric.

In a woven composite fabric as subject of the invention, in which the metal elements are present in only one direction, the polymer tapes in the opposite direction of the fabric will take all inweaving.

Polymer tapes may be present in both directions of the woven fabric (being warp direction and weft direction). However, preferably, polymer tapes are only present in weft direction.

Preferably, the metal elements are only present in either warp or weft direction. Preferably, metal elements are only present in warp direction.

Different weaving processes may be used to provide a woven composite fabric as subject of the invention. A woven composite fabric may be woven on a tape loom, providing strips or bands up to approximately 20 cm width. Alternatively, a woven composite fabric may be woven on a broad loom, as known in the art. Afterwards, such broad woven composite material may be slit in appropriate widths, e.g. 50 cm. When metal elements are only present in warp direction, such fabric as subject of the invention may e.g. be slit by warm cutting of the weft elements, being polymer tapes, so preventing selvedges to unravel.

A woven composite fabric as subject of the invention with metal elements only in warp or weft direction has several advantages. The metal elements run substantially straight in the fabric, since the relatively low thickness of the polymer tapes gives these polymer tapes a high flexibility. This results in an inweaving factor of 1 from the metal elements, whereas all inweaving is done by the polymer tapes. Further, the density of metal elements may be extremely high, since the distance between the circumference two adjacent metal elements can be kept substantially equal to the thickness of the polymer tape. The thickness of a woven composite fabric as subject of the invention with metal elements only in warp or weft direction substantially equals to the thickness of the metal element. If relatively simple weaving structures are used, e.g. plain woven structures, reinforced plain woven structures (with double or multiple warps and/or wefts), twill woven structures, reinforced twill woven structures (with double or multiple warps and/or wefts), satin woven structures, reinforced satin woven structures (with double or multiple warps and/or wefts), the metal elements will always be partially present at both sides of the woven composite fabric, although this may be influenced by the used woven structure.

For certain applications however, it may be preferred to have more polymer material at one side of the woven composite fabric. This may be obtained by weaving a metal element and a polymer tape simultaneously into the woven composite fabric. They behave so to say as twins, while the metal element engages the polymer tape over its whole length at the same long side of the polymer tape. The metal element lies 'on top of' the polymer tape. The polymer tape is oriented towards the side of the woven composite fabric, where more polymer material is required.

In other applications, the use of only metal elements and polymer tapes may not provide enough polymer material to the woven composite fabric. In order to obtain a woven composite fabric comprising enough polymer material, some of the polymer tapes and/or metal elements may be replaced by polymer filaments or polymer yarns. Another alternative to provide more polymer material to the fabric is to coat the metal element with a polymer layer, e.g. by extrusion.

Alternatively, a woven composite fabric as subject of the invention may further comprise other reinforcing elements, such as glassfiber yarn or filaments or carbon fiber yarns or filaments.

The eventual use of a woven composite fabric according to the invention is to manufacture reinforced articles. In order to manufacture a reinforced sheet or a reinforced article, woven composite fabrics comprising the metal elements and the polymer tapes are subjected to a temperature and/or pressure sufficient to cause the polymeric material to flow and fill the interstices between the metal filaments. This can be done in one step or may require subsequent steps. Possibly, other polymer material, e.g. polymer sheets, are added or a layer of polymer material is extruded. In case more than one woven composite fabric is used, said fabrics laying one on top of the other, possibly separated by an additional sheet of polymer material, such structure is referred hereafter as "layered structure".

The fabric or layered structure is heated upto a temperature that allows the polymer material to soften and to flow out. The temperature remains thereby lower than the melting point of the metal elements. The heat and/or pressure can for example be applied by feeding the woven composite fabric through pressure rollers.

Since the metal elements have a high thermal and electric conductivity, the metal elements themselves can also be used to heat and soften the polymer material, The latter way of heating can be considered as very efficient since it decreases the time to soften the polymer material.

During the manufacturing of a reinforced article, a woven composite fabric according to this invention has the advantage that it can be flexed or bent to shape. This can for example be realised by placing a woven composite fabric or possibly a layered structure comprising a number of woven composite fabrics, in a press, possibly in a heated press. Alternatively, a shaped reinforced article can be manufactured in two successive steps. In a first step a reinforced sheet can be obtained by applying heat and/or pressure to one or more woven composite fabrics according to the invention and in a second step, this reinforced sheet can be deformed to obtain a reinforced article.

Possible forming processes are press forming, flow moulding, thermofolding and membrane forming. In a press forming operation (stamping) one or more woven composite fabrics or a reinforced sheet are heated to processing temperature and stamped to shape in a two-part-tool under pressure. In a flow moulding operation (moulding) one or more woven composite fabrics or a reinforced sheet are heated to processing temperature, placed in a two-part-tool and then under pressure the mould cavity is filled by polymer matrix flowing into every recess of the mould.

In a thermofolding operation one or more woven composite fabrics or a reinforced sheet are heated locally and folded. In a membrane forming operation an autoclave pressure is used to drape the preheated woven composite fabrics or reinforced sheet over a tool.

The reinforced article can further be embedded in a matrix of thermoplastic material either before or after the forming process. A possible method to realize this is by bringing a woven composite fabric into contact with a polymer sheet either at one side or at the upper side and at the lower side of the fabric. In this way a laminated structure is formed. The polymer sheets are bonded to the woven composite fabric for example by pressing the laminated structure through heated rollers.

An alternative method to embed the woven composite fabric in a matrix of a thermoplastic material is by overinjection or overextrusion.

A woven composite fabric, comprising metal elements only in warp direction, and preferably comprising only polymer tape in weft direction may be used to provide reinforced tubes or hoses. The woven composite fabric preferably has a width of less than 50 cm, e.g. less than 20 cm, such as 5 cm or less. Such woven composite fabric may e.g. be wound helicoidally round an extruded polymer tube, either in S- or Z-direction and with a given step and a given angle between the metal element and the axis of the extruded polymer tube. Additional layers of woven composite fabric may be provided round this tube and first layer of woven composite fabric. The thickness of the reinforcing layer, being different layers of woven composite fabric as subject of the invention added one on top to the other, will be substantially equal to the sum of the thickness of the metal elements in each woven composite fabric. Eventually other layers may be added to the obtained tube-like volume. If necessary, the tube-live volume is overextruded with an outer polymer layer or the tube-like volume is heated in order to adhere the metal elements to the polymer material present in the volume. Using woven composite fabrics as subject of the invention improves the adhesion to the polymers used to provide the pipe, tube or hose. The polymer material, present between the layers comprising metal elements, will adhere to the metal elements present in its vicinity. This may be a metal element, being part of the woven composite structure in which the polymer is comprised, or a metal element, provided by an adjacent layer of woven composite fabric. The polymer material of e.g. an extruded underlying polymer tube, may adhere directly to the metal elements of the reinforcing adjacent layer, when this layer comprises a woven composite fabric as subject of the invention. Further, the thickness of the reinforcing layers, being woven composite fabrics, is reduced to a minimum, as compared to the existing reinforcing layers comprising metal elements.

Polymer tape made of any type of polymer material may be used to provide a woven composite fabric as subject of the invention. Examples of suitable polymer materials are: polyethylene (PE) such as high density polyethylene (HDPE), polypropylene (PP), polystyrene (PS), polyethylene terephthalate (PET), polyethylene napthalate (PEN), polybuteen terephthalate (PBT), polyvinylchloride (PVC), polyester, polyamide (PA), polyimide (PI), polycarbonate (PC), styrene acrilonitryl (SAN), acrylonitril-butadiene-styrene (ABS), thermoplastic polyurethane (TPU), thermoplastic polyolefins (TPO), thermoplastic copolyetheresters, copolymers of these polymers or similar materials.

Possibly, the polymer tapes itself may be reinforced, e.g. they may comprise glass- or carbon fibers next to the polymer material.

Any type of metal elements may be used to provide a woven composite fabric as subject of the invention. Preferably steel elements are used, such as steel wires or steel cords.

When strands or cords are used in the woven composite fabric, preference is to be given to those strands or cords, which have a large and rough surface so as to increase the mechanical anchoring to the polymer materials after appropriate treatment, e.g. heat treatment, this polymer material coming from either the polymer tapes or other polymer material used to provide the composite article, hose or tube which comprise the woven composite fabric. Examples are 3×3 and 7×3 cords, preferred to single stranded cords. Other steel cord construction as may be open cords or compact cords. Preferred cords are "0.25+18×0.22HT" and "3×0.265+9×0.245" cords.

To improve the corrosion resistance of the metallic elements, the metallic elements can be coated with a metallic coating layer such as zinc or a zinc alloy such as brass. A suitable zinc alloy is an alloy comprising 2 to 10% Al and 0.1 to 0.4% of a rare earth element such as La and/or Ce.

In order to assure a good adhesion between the metal elements and the polymer material either from the polymer tapes or other polymer material used to provide the composite article, hose or tube which comprise the woven composite fabric, an adhesion promoter can be applied on the metallic element. Possible adhesion promoters are bifunctional coupling agents such as silane compounds. One functional group of these coupling agents is responsible for the binding with the metal or metal oxides; the other functional group reacts with the polymer. More details about these coupling agents can be found in the PCT application WO-A-99/20682. Other suitable adhesion promoters are aluminates, zirconates or titanates.

Wires used as such or comprised in a strand or cord may have various cross-sections and geometries, e.g. circular, oval or flat. Within the range of wires, strands and cords, a large variety of materials can be used, dependent on the required mechanical strength. Wires used as such or comprised in a strand or cord, can have a diameter of 0.04 mm to 1.0 mm, preferably between 0.1 mm and 0.4 mm, e.g. 0.15 mm, 0.175 mm or 0.3 mm.

Wires having a structural deformation, may also be used to provide a strand or cord. These strands or cords may form part of the woven composite fabric.

Any metal can be used to provide the metallic elements. Preferably alloys such as high carbon steel alloys or stainless steel alloys are used.

When steel wire is used, the tensile strength of the steel wires ranges from 1500 N/mm$^2$ to 3000 N/mm$^2$ and even more, and is mainly dependent upon the composition of the steel and the diameter.

Also other parameters of a strand or cord, such as the construction of the strand or cord, the number of wires and the diameters of each wire comprised in a strand or cord, the force at rupture of each wire comprised in the strand or cord, can be chosen to provide the required mechanical properties such as strength and elongation at rupture.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
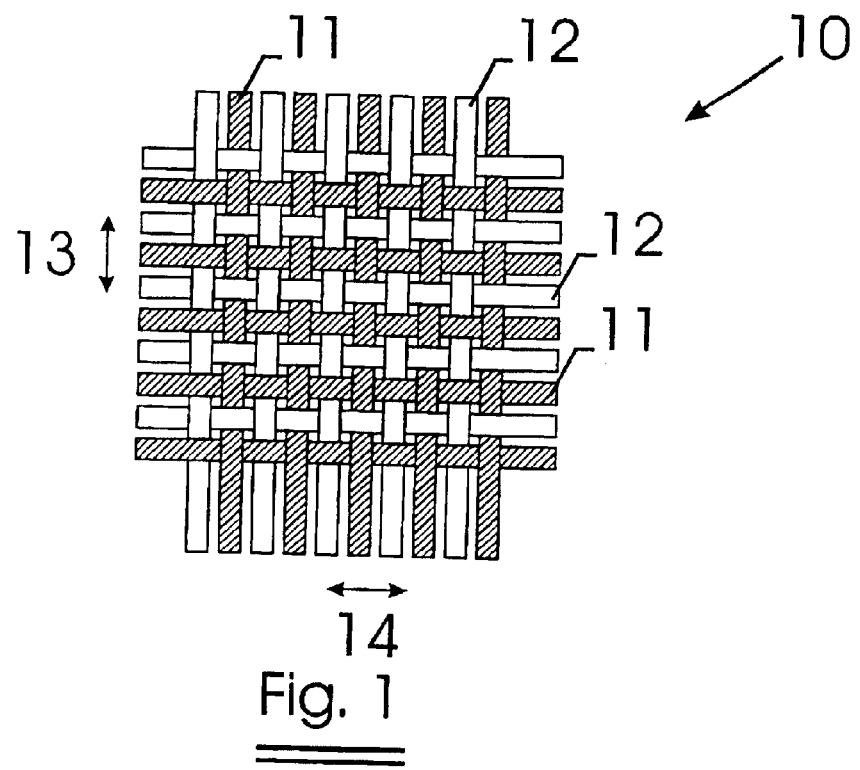
FIGS. 1 to 4 are schematic views of different possible embodiments of a woven composite fabric as subject of the invention.

An embodiment of the present invention is shown schematically in FIG. 1. A woven composite fabric 10 comprises metal elements 11 and polymer tapes 12. For this embodiment, metal elements and polymer tapes are present both in warp direction 13 and weft direction 14. Preferably a steel cord, e.g. a steel cord with construction 0.25+18×0.22 HT is used. With 'HT' is meant that for the construction of the steel cord, steel wires with High tenacity were used. Preferably high density polyethylene (HDPE) tapes having a thickness less than 150 µm, preferably less than 100 µm, most preferably less than 30 µm such as 15 µm and a width less than 5 mm, e.g. 3 mm are used. Preferably a plain-woven structure as shown in FIG. 1 is used.

Figure 2:
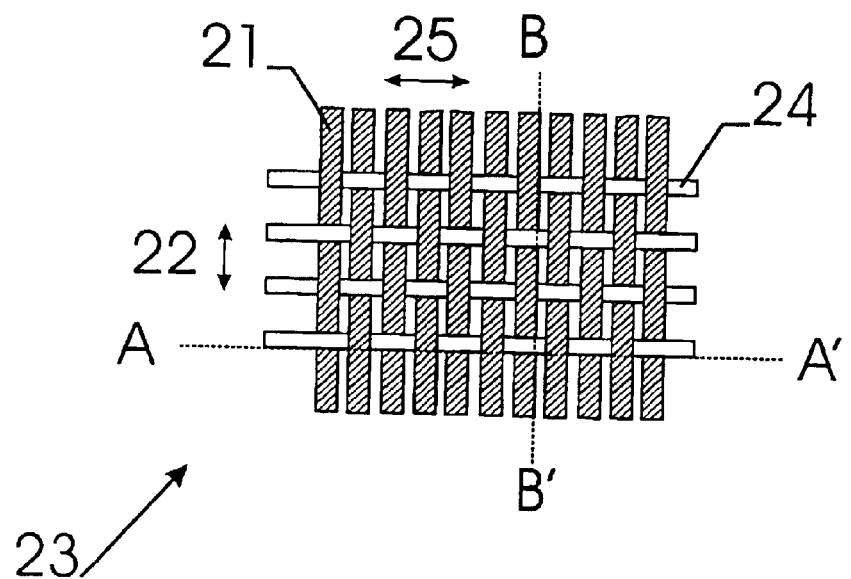
Figure 3A:
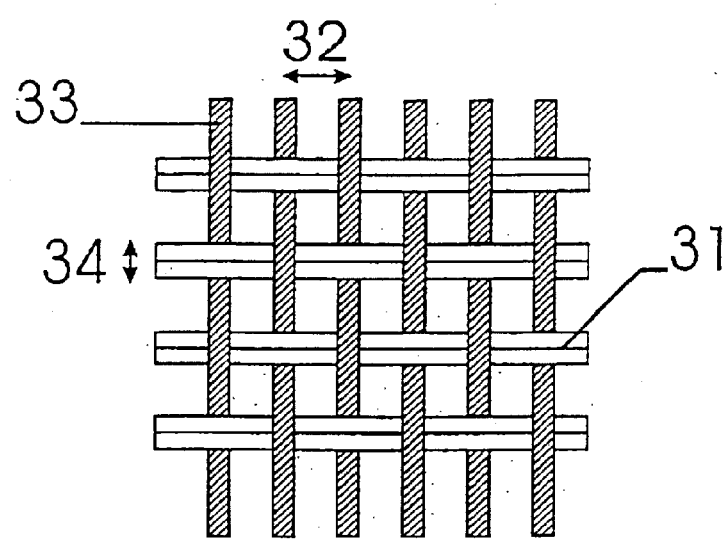
Figure 3B:
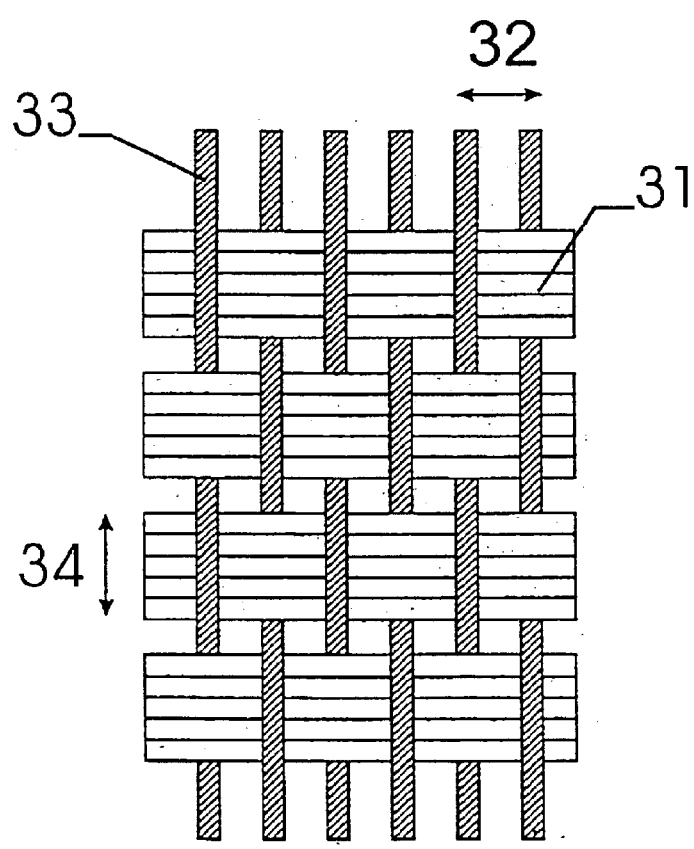
Figure 4:
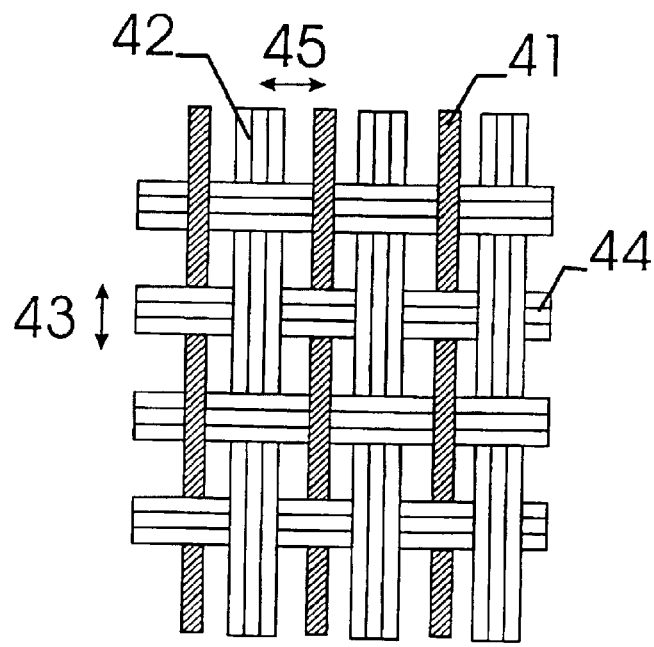

Other preferred embodiments of the present invention are schematically shown in FIGS. 2 to 4.

As shown in FIG. 2, the metal elements 21 are only present in warp direction 22 of the woven composite fabric 23. Polymer tapes 24, e.g. HDPE tapes having a thickness less than 150 µm, preferably less than 100 µm, most preferably less than 30 µm such as 15 µm and a width less than 5 mm, e.g. 3 mm are provided in weft direction 25. Also here, a plain-woven structure is used, although alternative weaving structures such as twill-structures or satin structures must not be excluded.

Other alternative embodiments are shown in FIGS. 3a and 3b where woven structures are used having multiple weft insertions. More than one polymer tape 3, e.g. two or three polymer tapes, are woven into the weaving structure in an identical way in weft direction 32 metal elements 33 are provided in warp direction 34.

Another embodiment is shown in FIG. 4, where next to metal elements 41, polymer tapes 42; e.g. HDPE tapes are provided in warp direction 43. Preferably, only polymer tapes 44, e.g. HDPE tapes are used in weft direction 45. Polymer tapes in warp and weft direction may be different, e.g. different polymer material, different polymer density, different thickness, different widths. They may be present as multiple warps or weft.

Figure 5A:
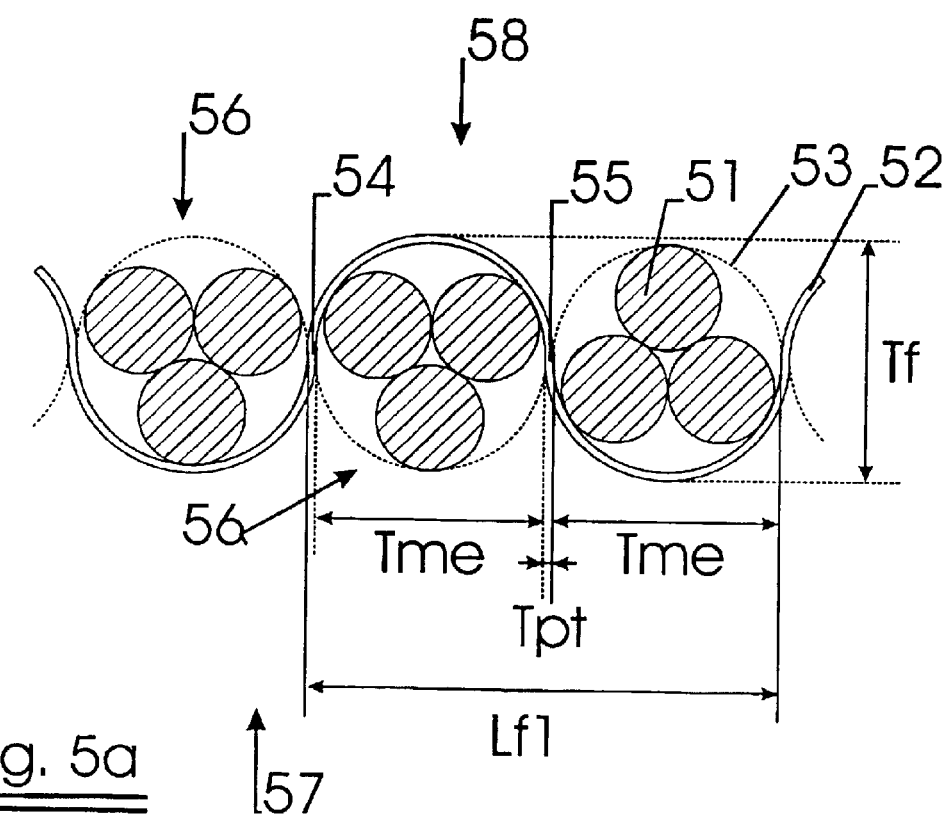
FIGS. 5 (5a and 5b) are cross-sections of a woven composite fabric as shown in FIG. 2.
Figure 5B:
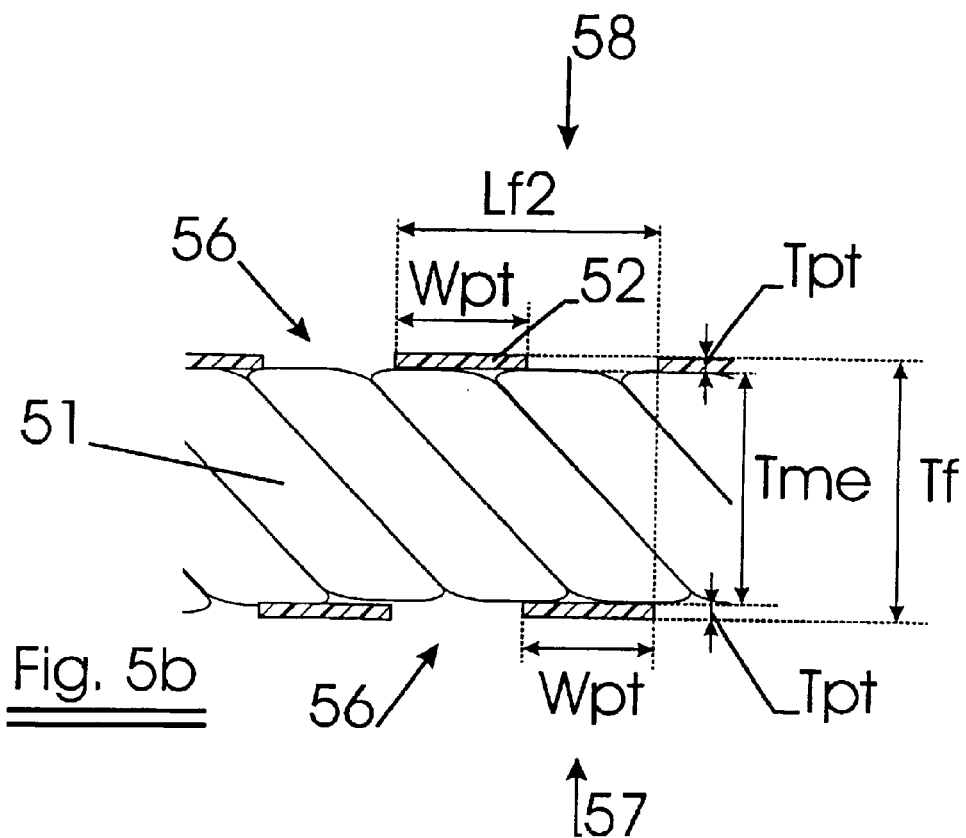

Cross-sections of the woven composite fabric as shown in FIG. 2, are shown in FIG. 5a and FIG. 5b. A cross-section according to the plane AA', is shown in FIG. 5a. A cross-section according to the plane BB', is shown in FIG. 5b.

In FIG. 5a, a cross-section of the metal elements 51, e.g. a 3-plied steel cord, is shown. A polymer tape 52 is running alternatingly over and under the metal elements 51, according to the plain-woven structure.

Three advantages of a woven composite fabric as subject of the invention having metal elements present in only one direction (in the present embodiment the warp direction) may be understood from this schematic drawing.

A first advantage is that the thickness of the woven composite fabric, and, when used to reinforce composite articles and/or reinforced pipes, hoses or tubes, the thickness of the reinforcing layer, may be reduced to a minimum, being substantially the diameter of the metal elements. This diameter is the diameter of the circumference 53 of the metal element, also called the optical diameter of the metal element. Fabric thickness Tf is limited to Tme+2*Tpt, where Tf is the thickness of the woven composite fabric, Tme is the diameter of the metal element and Tpt is the thickness of the polymer tape. Since Tpt is preferably much smaller than Tme, typically less than 150 µm, even less than 100 µm such as 30 µm or 15 µm, Tf is substantially equal to Tme. This advantage is also shown in FIG. 5b.

A second advantage is that the density of metal elements may be very high and substantially equal to the maximum density possible in weft direction. Further, the metal elements are present substantially straight in the woven composite fabric, so the inweaving factor to the metal elements may be substantially equal to 1. Since the polymer tapes are very thin, and extremely flexible, the polymer tapes may engage the circumference 53 of the metal elements very intimately. The distance between two circumferences 53 of two adjacent metal elements 51 may be reduced to the thickness of the polymer tape Tpt. This space between two adjacent metal elements is filled with the polymer tape, according to the weaving structure in which it is woven.

As may be noticed in FIG. 5$b$, in warp direction the metal element runs substantially straight in the woven composite fabric. As is seen in FIG. 5$b$ the length of the metal element to provide a fabric length in warp direction Lf2, equals this Lf2. Therefor the inweaving factor is 1.

On the other hand, in weft direction as shown in FIG. 5$a$, the length of polymer tape to provide a fabric length Lf1 in weft direction is substantially equal to Lpt=$\pi$*(Tme+Tpt)/2, being half of a circle with radius (Tme/2+Tpt/2).

The inweaving factor of the polymer tape in the plain-woven structure in this embodiment is Lpt/Lf1=$\pi$/2, which is the maximum value possible.

A third advantage of a woven composite fabric as subject of the invention is that, when such fabric is used to reinforce composite articles and/or reinforced pipes, hoses or tubes, polymer material from other components of the composite article or hose, tube or pipe, may contact directly the metal element of the woven composite fabric, used as reinforcing layer. Zones 56 of the metal elements are present at one of the outer surfaces 57 and 58 of the fabric. Here, polymer material from adjacent components may contact to the metal element, so improving the anchoring of the metal elements to the whole structure of the reinforced article, pipe, tube or hose.

As shown in FIG. 5$b$, a polymer tape used to provide a woven composite fabric as subject of the invention has a substantially rectangular cross-section, characterized by a width Wpt and a thickness Tpt. Wpt is preferably less than 10 mm, whereas Tpt is preferably less than 1000 $\mu$m. However, when fine metal elements are used, the thickness of the polymer tape is preferably less than 150 $\mu$m.

Figure 6:
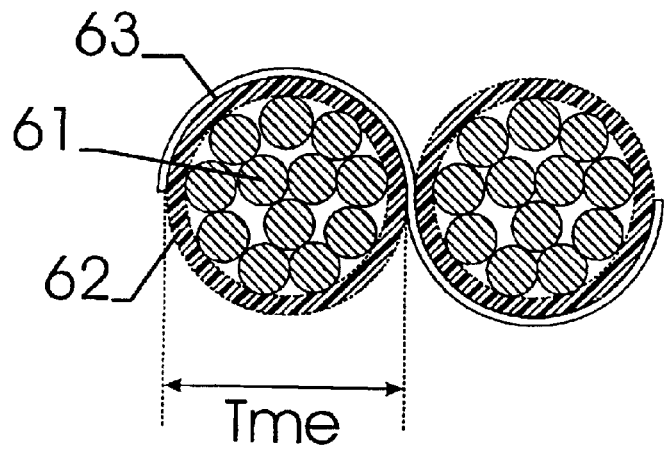
FIGS. 6 and 7 are cross-sections in weft direction of alternative woven composite fabrics as subject of the invention.

When coated metal elements are used to provide a woven composite fabric as subject of the invention, Tme is to be understood as the thickness of the metal element, including the polymer layer. A cross-section in weft direction of such a woven composite fabric, having a plain weaving structure, is shown in FIG. 6. A metal element 61, being a 3×0.265+9×0.245 is coated with a polymer layer 62. Polymer tape 63 is used in weft direction. The metal element diameter Tme is the optical diameter of the steel cord 61 plus the thickness of the polymer layer 62.

Figure 7:
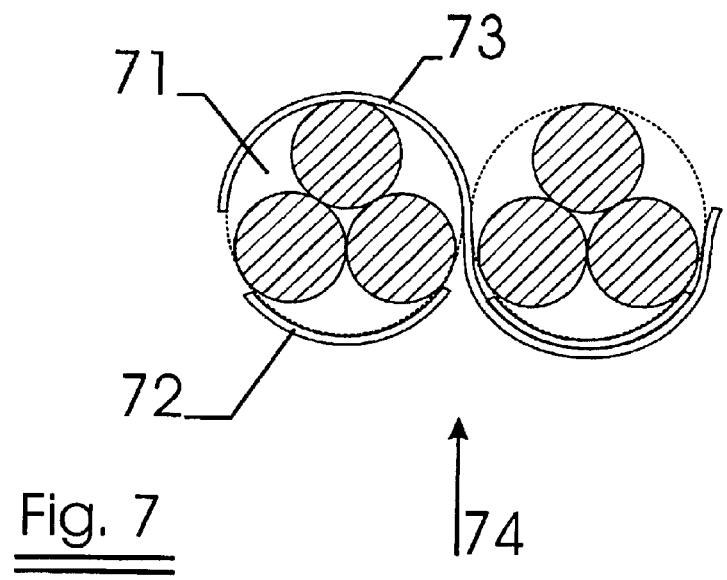

To provide more polymer material at one side of the woven composite fabric as subject of the invention, a polymer tape and metal element may be woven into the fabric as twin warps, as shown in cross-section in weft direction of an embodiment, shown in FIG. 7. Metal element 71 and polymer tape 72 follow the same path through the whole fabric. In weft direction, polymer tape 73 is provided. At the fabric side 74, either polymer tape 73 or 72 will be visible, whereas metal element will not substantially be visible at this side of the fabric.

Figure 8:
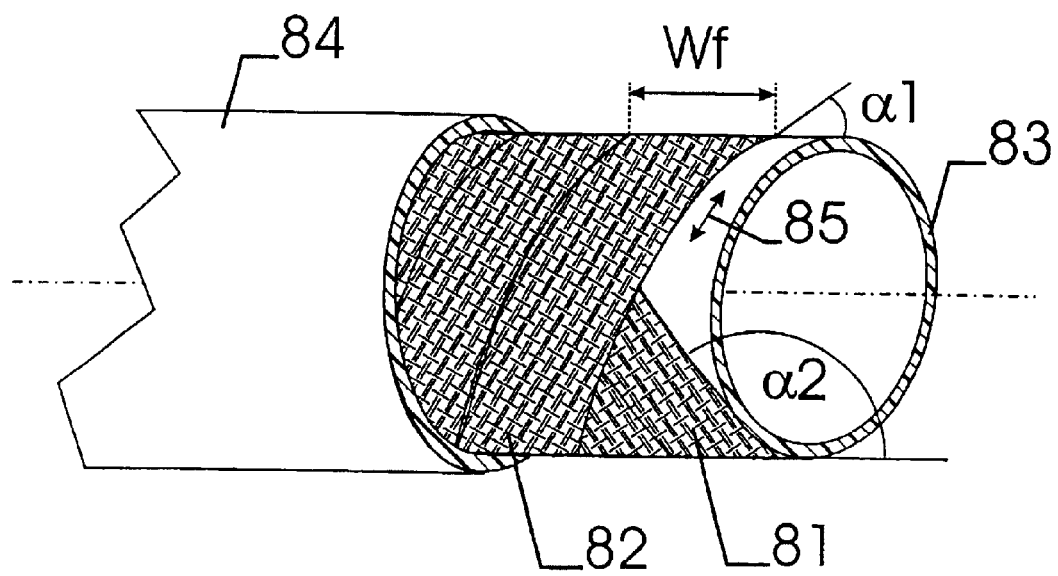
FIG. 8 is a reinforced hose, using a woven composite fabric as subject of the invention.

As shown in FIG. 8, a reinforced tube may comprise one or more layers of woven composite fabric 81 and 82 being wound round a tubular core, e.g. an extruded polymer tube 83. On top of the reinforcing layers, an outer polymer layer 84 may be provided. The woven fabric is preferably provided as a strip with width Wf, and having metal elements running parallel to the winding direction 85 of the strip. The strips may be wound using different winding angles $\alpha$1 and $\alpha$2. Usually, the strip width Wf is between 5 cm and 50 cm. Most preferably, but not restrictively, all polymer material, either in the woven composite fabric or the extruded polymer material, is HDPE.

What is claimed is:

1. A woven composite fabric, said fabric comprising metal elements and polymer elements, said metal elements comprising at least one of metal wires, bundles of metal wires, metal strands and metal cords, wherein said polymer elements are polymer tapes, wherein said fabric has a warp direction and a weft direction, and wherein all of said polymer tapes are present in said weft direction.

2. A woven composite fabric as in claim 1, wherein each of said polymer tapes has an essentially rectangular cross-section.

3. A woven composite fabric as in claim 2, wherein said cross-section has a thickness less than 1000 $\mu$m.

4. A woven composite fabric as in claim 2, wherein said cross-section has a width less than 10 mm.

5. A woven composite fabric as in claim 1, wherein all of said metal elements are present in said warp direction.

6. A woven composite fabric as in claim 1, wherein said metal elements have an inweaving factor substantially equal to 1.

7. A woven composite fabric as in claim 1, wherein said metal elements are steel cords.

8. A woven composite fabric as in claim 1, wherein said fabric has a plain woven structure.

9. A woven composite fabric, said fabric comprising metal elements and polymer elements, said metal elements comprising at least one of metal wires, bundles of metal wires, metal strands and metal cords, wherein said polymer elements are polymer tapes, and wherein said fabric has a double weft structure worked in a plain-weave manner.

10. A woven composite fabric as in claim 1, wherein each of said metal elements is coated with a polymer layer.

11. A reinforced hose comprising:

at least one of a hose and a tube; and a woven composite fabric as in claim 1 connected with said at least one of a hose and a tube.

12. A method of manufacturing a reinforced hose or tube, said method comprising the steps of:

providing a woven composite fabric comprising metal elements and polymer elements, said metal elements comprising at least one of metal wires, bundles of metal wires, metal strands and metal cords, wherein said polymer elements are polymer tapes;

winding one or more layers of said woven composite fabric around a tubular core; and providing an outer layer of polymer material.

13. The method as in claim 12, wherein said fabric has a warp direction and a weft direction, and wherein all of said polymer tapes are present in said weft direction.

14. A woven composite fabric as in claim 3, wherein said cross-section has a width less than 10 mm.

* * * * *